Oct. 21, 1941.                G. T. MEYERS                 2,259,763
                             SHEAR STRUCTURE
                           Filed Sept. 15, 1939

INVENTOR
George T. Meyers.
BY
ATTORNEYS

Patented Oct. 21, 1941

2,259,763

UNITED STATES PATENT OFFICE 2,259,763

SHEAR STRUCTURE

George T. Meyers, Parkersburg, W. Va., assignor to The Meyers Company, Parkersburg, W. Va., a corporation of West Virginia Application September 15, 1939, Serial No. 295,055

4 Claims. (Cl. 49—14)

My invention relates to a shear structure. It has to do, more particularly, with a shear structure adapted to be associated with apparatus for feeding molten glass in the form of a stream in order to divide the stream into charges of predetermined size.

As is well known, considerable difficulty is encountered in the manufacture of glassware in attempts to eliminate the shear mark from the finished article. This shear mark is caused by the chilling effect of the shears as they cut the stream of glass. Many efforts have been made to overcome the shear marks. These efforts have involved the reheating of the lower end of the stream of glass after a charge has been sheared therefrom. For this purpose, complicated mechanism is required.

One of the objects of my invention is to provide a shear structure which is of such a nature that it will shear the glass without causing shear marks and, therefore, reheating of the lower end of the stream of glass will not be required.

Another object of my invention is to provide a shear structure of the type indicated which is of a very simple nature.

In its preferred form, my invention contemplates the provision of a shear structure which includes a plurality of movable blades adapted to pass through the stream of molten glass. These blades are of a novel shape. They are preferably curved upwardly so that as they cut through the glass they will produce a concave depression in the lower end of the glass stream. The result is that the last portion of the glass to be severed, which is at the center of the stream, is forced upwardly into the stream at the center thereof where the glass is the hottest. Because this portion of the glass is forced back into the hottest portion of the glass it will be reheated and a shear mark caused by the chilling effect of the blades will be eliminated.

The preferred embodiment of my invention is illustrated in the accompanying drawing wherein similar characters of reference designate corresponding parts and wherein.

Figure 1:
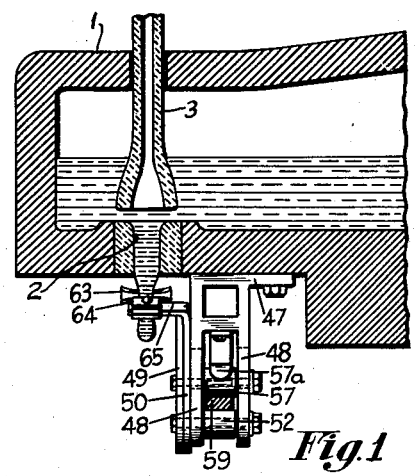
Figure 1 is a vertical sectional view taken through a glass feeding spout having my shear structure associated therewith.
Figure 2:
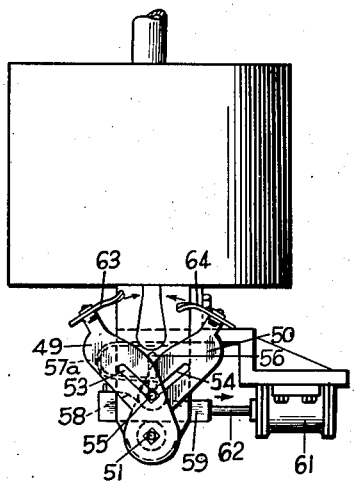
Figure 2 is an end view of the structure shown in Figure 1.

With reference to the drawing, I have shown my shear structure in association with glass feeding means of the type disclosed in my Patent No. 2,079,519 issued May 4, 1937. However, it is to be understood that my shear structure may be employed with other types of glass feeders.

In the drawing, I have illustrated a spout 1 having a discharge orifice 2 and means 3 for controlling the flow of glass therethrough. These elements may be the same as the corresponding elements disclosed in my patent. Below the orifice, I mount my shear structure in the following manner.

The shear structure is supported on a bracket 47 attached to the lower side of the spout adjacent the orifice thereof.

Figure 3:
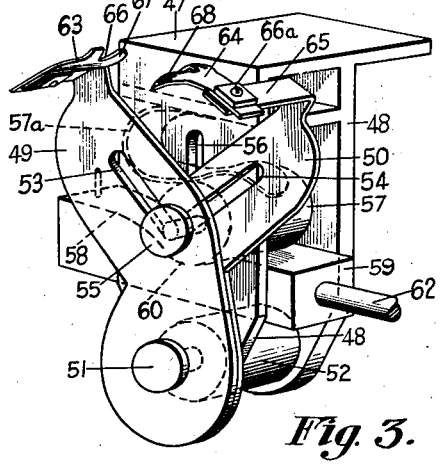
Figure 3 is a perspective view of the shear structure illustrated in Figures 1 and 2.
Figure 4:
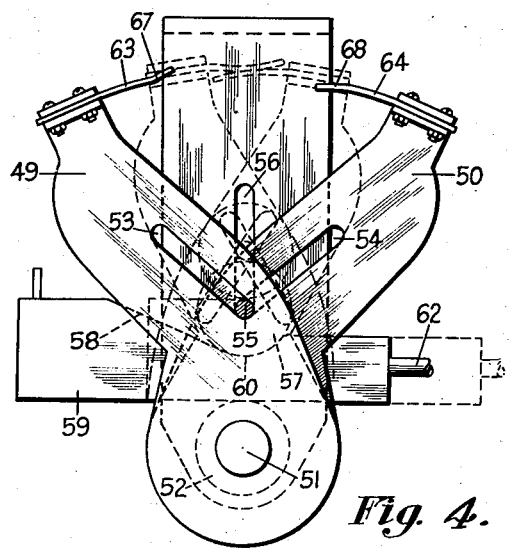
Figure 4 is a side elevational view of the structure illustrated in Figure 3.

This bracket has a pair of spaced depending legs 48. A pair of plates 49 and 50 are disposed in overlapping relationship and are secured to the legs 48 by means of a pivot pin 51 passing through aligning openings formed in the lower ends thereof. This pin 51 also carries a roller 52 between the legs 48. The plates 49 and 50 diverge at their upper ends to form a substantially Y-shaped structure. In the diverging portion of the plate 49, a slot 53 is formed and in the diverging portion of the plate 50 a similar slot 54 is formed. A pin 55 passes through these slots and through a vertical slot 56 formed in one leg 48 of the bracket. It will be apparent that the slots 53 and 54 are at an angle relative to the slot 56. The pin 55 also carries a roller 57 which is disposed between the legs 48. This roller is adapted to contact with the upper cam surface 58 of a block 59. The block 59 rests on the roller 52. The cam surface 58 has a dip 60 formed therein intermediate its ends. When the roller 57 is positioned in this dip, the upper ends of the plates 49 and 50 will be spaced apart as indicated in Figure 3 and as indicated by the full lines in Figure 4. However, if the member 59 is moved in either direction, the roller 57 will ride up upon a high part of the cam causing the diverging portions of members 49 and 50 to approach each other. Movement of the member 59 may be controlled by a piston and cylinder unit 61 connected to the member 59 by a rod 62. A spring 57a presses downwardly on roller 57.

The upper ends of the plates 49 and 50 carry shear blades 63 and 64. Each of the blades is attached to a laterally extending lug 65 by means of a clamp 66a. The blades 63 and 64 are curved both longitudinally and transversely or, in other words, they have a substantially spherical curvature. When the members 49 and 50 move towards each other, the blades will be moved into overlapping relationship. Each of the blades has a notch 66 formed in its outer end. The extreme end of the blade 63 is upturned slightly as at 67 while the extreme end of the blade 64 is down turned slightly as at 68 to prevent binding. It will be apparent that as the blades approach each other and move into overlapping relationship, they will shear the stream of glass and will center it. Also due to the shape of the blades they will produce a spherical concavity in the lower end of the stream of glass eliminating the shear mark.

Figure 5:
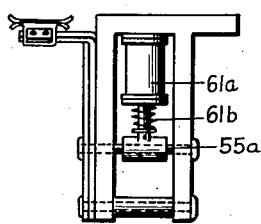
Figure 5 is a view in side elevation illustrating different means for operating the shear structure shown in Figures 3 and 4.
Figure 6:
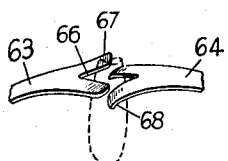
Figure 6 is a perspective view illustrating the shape of the blades of the shear structure shown in Figures 3 and 4.

Instead of operating the shear structure by the cam arrangement illustrated in Figures 1 to 4, I may employ the arrangement illustrated in Figure 5. In this instance the pin 55a may be moved vertically by a cylinder and piston unit 61a which is connected directly thereto. A spring 61b normally keeps the pin 55a in its lower position. Suitable controls may be provided for applying air to and exhausting air from the member 61a in order to cause it to move the pin 55a upwardly.

It will be apparent from the above description, that I provide a shear structure and a method of shearing glass which is of such a nature that the glass will be sheared without causing shear marks and, therefore, reheating of the lower end of the stream of glass will not be required. The shear structure is very simple and compact and is very efficient.

Various other advantages will be apparent from the preceding description, the drawing and the following claims:

Having thus described my invention what I claim is:

1. A shear structure comprising a pair of members pivoted together adjacent one end, each of said members having a laterally extending support, adjacent its free end, a blade carried by each of said supports, said supports having lower portions which are substantially vertical and which overlap each other, the upper ends of said members diverging outwardly and normally being spaced apart so that said blades will be spaced apart, and means for causing the diverging ends of said members to move towards each other so that said blades will move into cooperative relationship, said means comprising diverging slots formed in the diverging portions of said members and a pin cooperating with said slots, and means for moving said pin towards and away from the pivot point of said members.

2. A shear structure comprising a pair of members pivoted together by a pin at their lower ends, each of said members having a laterally extending support at its upper end, a blade carried by each of said supports, said members having lower portions which are substantially vertical and which overlap each other and having upper portions which diverge outwardly and normally are spaced apart so that said blades will be spaced apart, means for causing the diverging ends of said members to move towards each other so that said blades will move into cooperative relationship, said means comprising diverging slots formed in the diverging portions of said members, a pin supported for movement in a perpendicular direction and extending into said slots, and means for moving said pin towards and away from the pivot pin of said members.

3. A shear structure according to claim 2 wherein said last-named means embodies a cylinder and piston unit connected to the movable pin.

4. A shear structure according to claim 2 wherein said last-named means embodies a reciprocable cam member disposed between said pivot pin and the movable pin.

GEORGE T. MEYERS.